United States Patent
Suresh et al.

(10) Patent No.: US 10,579,339 B2
(45) Date of Patent: Mar. 3, 2020

(54) RANDOM NUMBER GENERATOR THAT INCLUDES PHYSICALLY UNCLONABLE CIRCUITS

(71) Applicant: Intel Corporation, Santa Clara, CA (US)

(72) Inventors: Vikram B. Suresh, Portland, OR (US); Sanu K. Mathew, Hillsboro, OR (US); Sudhir K. Satpathy, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 88 days.

(21) Appl. No.: 15/479,424

(22) Filed: Apr. 5, 2017

(65) Prior Publication Data

US 2018/0293052 A1    Oct. 11, 2018

(51) Int. Cl.
| | |
|---|---|
| *H04L 9/32* | (2006.01) |
| *G06F 7/58* | (2006.01) |
| *H04L 9/06* | (2006.01) |
| *H04L 9/08* | (2006.01) |

(52) U.S. Cl.
CPC ............ *G06F 7/588* (2013.01); *H04L 9/0662* (2013.01); *H04L 9/0866* (2013.01); *H04L 9/3278* (2013.01)

(58) Field of Classification Search
CPC ............................... H04L 9/3278; G06F 7/588
See application file for complete search history.

(56) References Cited

U.S. PATENT DOCUMENTS

| | | | |
|---|---|---|---|
| 6,661,469 B1* | 12/2003 | Kawabata | H04N 5/142 345/63 |
| 8,415,969 B1* | 4/2013 | Ficke | G06F 7/588 326/8 |
| 9,806,719 B1* | 10/2017 | Mathew | H03K 19/1776 |
| 2003/0014452 A1* | 1/2003 | Le Quere | G06F 7/588 708/250 |
| 2004/0019619 A1* | 1/2004 | Buer | G06F 7/588 708/254 |
| 2008/0279373 A1 | 11/2008 | Erhart et al. | |
| 2011/0215829 A1* | 9/2011 | Guajardo Merchan | G06F 7/588 326/8 |
| 2014/0189365 A1 | 7/2014 | Cox et al. | |
| 2014/0325241 A1* | 10/2014 | Shimizu | G09C 1/00 713/192 |
| 2014/0351305 A1* | 11/2014 | Hamilton | G06F 7/588 708/251 |
| 2015/0092939 A1 | 4/2015 | Gotze et al. | |
| 2015/0146869 A1* | 5/2015 | Yamamoto | H03K 3/0375 380/44 |
| 2015/0347216 A1 | 12/2015 | Kim et al. | |

(Continued)

FOREIGN PATENT DOCUMENTS

EP    3113409 A1    1/2017

OTHER PUBLICATIONS

International Search Report and Written Opinion for PCT Patent Application No. PCT/US18/20977, dated Jun. 21, 2018, 8 pages.

*Primary Examiner* — Mohammad A Siddiqi
(74) *Attorney, Agent, or Firm* — Compass IP Law PC (57) ABSTRACT

An apparatus is described. The apparatus includes a plurality of physically unclonable circuits. The apparatus includes circuitry to detect which ones of the physically unclonable circuits are unstable. The apparatus also includes circuitry to couple the unstable physically unclonable circuits to a random number generator circuit.

11 Claims, 7 Drawing Sheets

(56) References Cited

U.S. PATENT DOCUMENTS

2016/0062951 A1* 3/2016 Yoshimura .............. G06F 17/18
  708/190
2016/0371059 A1* 12/2016 Riou ....................... H04L 9/002
2018/0102907 A1* 4/2018 Lin ...................... G06F 12/1408
2018/0262331 A1* 9/2018 Noguchi ............... H04L 9/0866

* cited by examiner

Figure 6: Cascaded entropy extraction using von Neumann extractor

Fig. 7

RANDOM NUMBER GENERATOR THAT INCLUDES PHYSICALLY UNCLONABLE CIRCUITS

FIELD OF INVENTION

The field of invention pertains generally to the semiconductor arts, and, more specifically, to a random number generator that includes physically unclonable circuits.

BACKGROUND

The ability to generate random information is an important feature for, e.g., encryption and other security applications. Here, the more perfect or truly random that the generated information is, the better the encryption or other security task that can be effected. As such, engineers are motivated to develop circuits capable of generating highly random information.

FIGURES

A better understanding of the present invention can be obtained from the following detailed description in conjunction with the following drawings, in which.

DETAILED DESCRIPTION

Circuits are generally designed to be insensitive (as much as practicable) to manufacturing tolerances. However, a class of circuits may be designed that are purposefully sensitive to manufacturing tolerances (so called, "physically unclonable circuits" or PUFs). For instance, a circuit that is implemented on a semiconductor chip may be designed to have a measurable or determinable property that is highly sensitive to the threshold and/or the gain of its constituent transistors.

Figure 1:
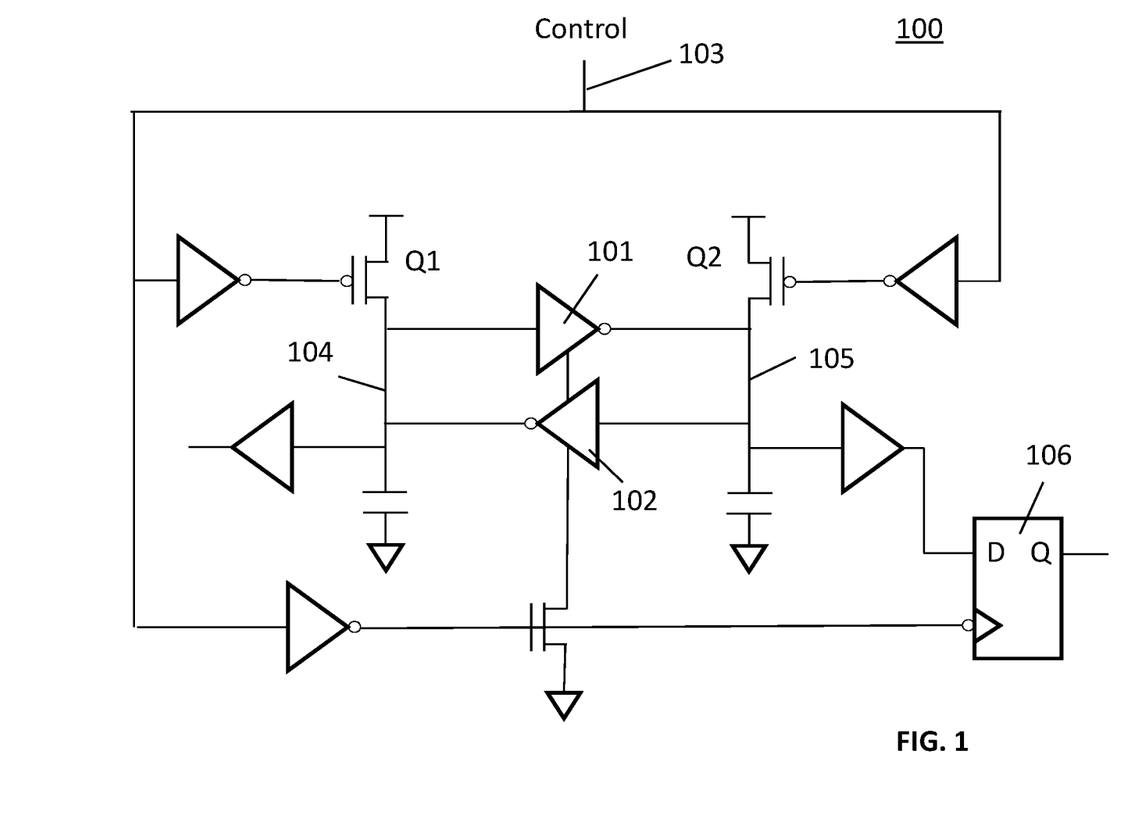
FIG. 1 shows an embodiment of a PUF circuit.

With significant sensitivity to certain parameters, and with the underlying manufacturing process having inherent variation with respect to these same parameters, identically designed instances of the circuit can exhibit different properties even if manufactured on the same semiconductor chip. FIG. 1 shows an example of a PUF circuit 100 that if implemented on a semiconductor chip will have properties that are sensitive to the threshold and gain of its constituent transistors.

As observed in FIG. 1, the PUF circuit 100 includes a pair of inverters 101, 102 with the respective output of both inverters being coupled to the respective input of the other inverter. Those of ordinary skill will recognize cross coupled inverters 101, 102 implement a latch circuit that is inherently stable by itself (a 0 at the input of a first inverter provides a 1 at the input of the second inverter which re-enforces the 0 applied at the first inverter). Here, the circuit 100 operates according this stable mode when both of transistors Q1 and Q2 are off which occurs when the control node 103 is set to a logic 0.

However, when the control node 103 transitions to a logic 1, the circuit 100 attempts to turn on both of transistors Q1 and Q2, which initially places the circuit into an unstable state. The unstable state will quickly return to a stable state if there is sufficient manufacturing variation amongst the different transistors of the inverters 101, 102, transistors Q1 and Q2 and/or the interconnect resistances between them. That is, although the circuit 100 as designed is symmetrical or balanced, owing to manufacturing tolerances, it may not actually be symmetrical or balanced as actually manufactured. If the circuit 100 is sufficiently imbalanced, the circuit will naturally "snap" to a stable state that is induced by the imbalance shortly after transistors Q1 and Q2 turn on.

For example, if transistors Q1 and Q2 have different response times, when the Control signal 103 releases the pre-charge, the latch node 104/105 attached to the faster pre-charge transistor starts to discharge earlier than the other node and will eventually have a higher probability of stabilizing to a 'zero'. The value that is held at node 105 is ultimately latched into flip-flop 106 which essentially stores which specific one of two possible states the node 105 snapped to.

Even if transistors Q1 and Q2 are manufactured identically, however, the circuit 100 can still snap to a stable state if there exists sufficient manufacturing differences associated with the inverters 101, 102 themselves. As is known in the art, transistor gain variation and/or transistor threshold voltage variation can affect the time at which an inverter will cause a receiving inverter to flip its output bit. Specifically, a lower driving inverter gain and a higher receiving inverter threshold will cause the receiving inverter to flip its output bit later in time. By contrast, a higher driving inverter gain and a lower receiving inverter threshold will cause the receiving inverter to flip its output bit sooner in time. For simplicity only transistor gain and threshold have been mentioned. But other manufacturing related properties can affect the timing of an inverter loop as described above (e.g., interconnect resistance(s), contact resistance(s), variation in transistor dimension(s), random dopant fluctuation etc.).

Here, even if both of the latch nodes 104, 105 are simultaneously pulled to a logic 1 when the control node transitions to a logic 1 (because transistors Q1 and Q2 are identical), one of latch nodes 104, 105 will start to be driven to a logic 0 before the other of the latch nodes 104, 105 (again, owing to, e.g., manufacturing differences in the transistors within the inverters 101, 102). Once one of the latch nodes 104, 105 starts to be driven to a logic 0 before the other of the latch nodes 104, 105, the circuit 100 will quickly snap to a stable state that holds the latch node that was first driven to logic 0 to a logic 0 and holds the other latch node to a logic 1. Again, whichever value node 105 snaps to is stored in flip-flop 106.

Figure 2:
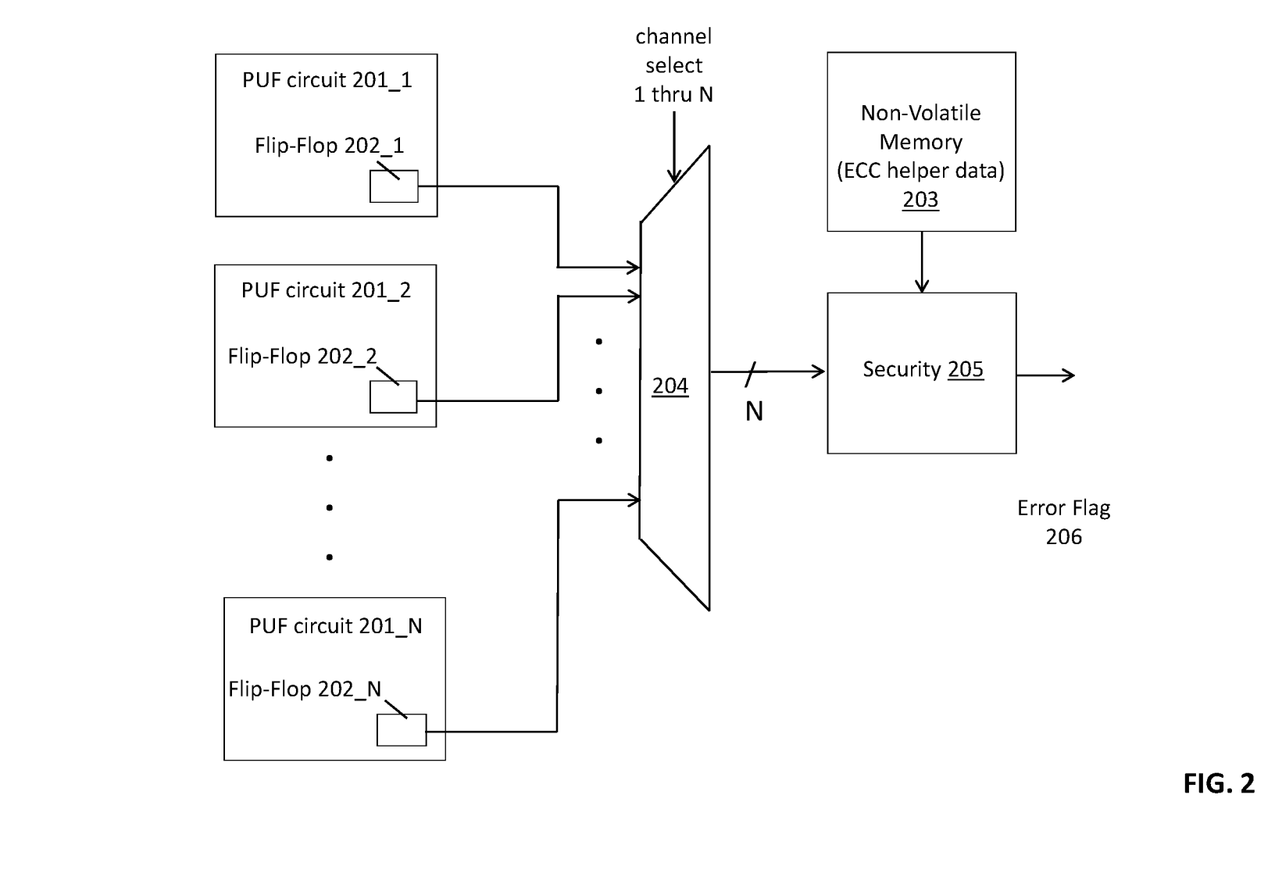
FIG. 2 shows an embodiment of a circuit that detects circuit degradation.

FIG. 2 shows a circuit having N instances 201_1 through 201_N of a circuit, such as the PUF circuit described just above, that sets itself to a 1 or a 0 depending on its specific combination of manufacturing variation(s). In an embodiment, the circuits 201_1 through 201_N are integrated on a same semiconductor chip (whereas in other embodiments the circuits may be integrated on a same printed circuit board). For convenience, a semiconductor die will be mostly referred to as an example.

In an embodiment that, e.g., uses the aforementioned PUF circuit 100 of FIG. 1 for each of PUF circuits 201_1 through 201_N, during the final product testing of the manufactured semiconductor die, the control node 103 transitions to a 1 to cause each of the N circuits to snap to their respective stable bit value which is then stored in each circuit's respective flip-flop 202_1 through 202_N. Each of the respective stable bit values kept in the flip flops 202_1 through 202_N can be combined to form, e.g., a secure ID or key for the semiconductor chip that is used to perform various security functions (e.g., encryption/decryption) with security circuitry 205 that is integrated on the semiconductor chip. The ID/key generally is prevented from leaving the chip or a secure system that is implemented with the chip. The security circuitry 205 may rely on ECC helper data stored in non volatile memory 203 to, e.g., correct bit errors in the key/ID that may evolve over time. The ECC helper data is also not exposed or otherwise cannot leak information about the key/ID provided by the PUF circuits 201_1 through 201_N.

As is known in the art, over the course of time and use, electronic circuitry will degrade such that at least one of its manufacturing related properties will change. As a consequence, the N PUF circuits 201_1 through 201_N may begin to demonstrate a change in their behavior. As such, the respective N bit signature may change over time. In the case of a reliability problem or manufacturing defect that corresponds to a serious degradation problem, the signature will change some significant amount which can subsequently be flagged as an early detection warning that the electronic chip or board is prone to imminent failure. As such, corrective action can be taken before a more serious fatal hard failure occurs.

The discussion above with respect to FIGS. 1 and 2 assumed that each of the PUF circuits 201_1 through 201_N will snap to a stable value. There can be instances, however, where a PUF circuit as manufactured is symmetrical or balanced such that it does not snap to a stable state when the control node transitions to a logic 1. For example, if transistors Q1 and Q2 are manufactured identically and both inverters are manufactured identically, the aforementioned mechanisms that snap the PUF circuit to a stable state may not arise. As such, the PUF circuit does not immediately snap to a stable state and instead remains in an unstable state for an extended period of time and/or, the PUF circuit will snap to a state based on temporal conditions like thermal noise, voltage droop, coupling from other circuits etc. Hence there is a high chance it will resolve to different states when evaluated multiple times.

Recognizing that the flip-flop 106 is designed to capture the value of node 105 a short time after the control value is set to a logic 1 (e.g., upon the control node 103 transitioning back to a logic 0 a short time after the control node 103 transitioned to a logic 1), the flip-flop 106 will latch either a 1 or 0 because the PUF circuit 100 did not snap to a stable state before the flip-flop 106 latched in its input value.

Circuits that behave in this manner (do not consistently resolve to one state) are unstable. In an embodiment, referring to FIG. 2, unstable PUF circuits are identified and their corresponding latched bit as read from their respective flip-flop are ideally not used for the signature code of the circuit that is used to detect chip degradation problems. As such, the signature word that is actually used is less than N bits. Here, the bits from unstable PUF circuits are marked as "dark bits". A dark bit mask vector (hereinafter, "dark bit mask") may be stored in, e.g., a non volatile memory (such as non volatile memory 203) that identifies which ones of the N bits from N PUF circuits emanate from an unstable PUF circuit. The dark bit mask is used to ignore the bits generated from the unstable PUF circuits whenever the signature key/ID for the circuit is being determined.

Figure 3:
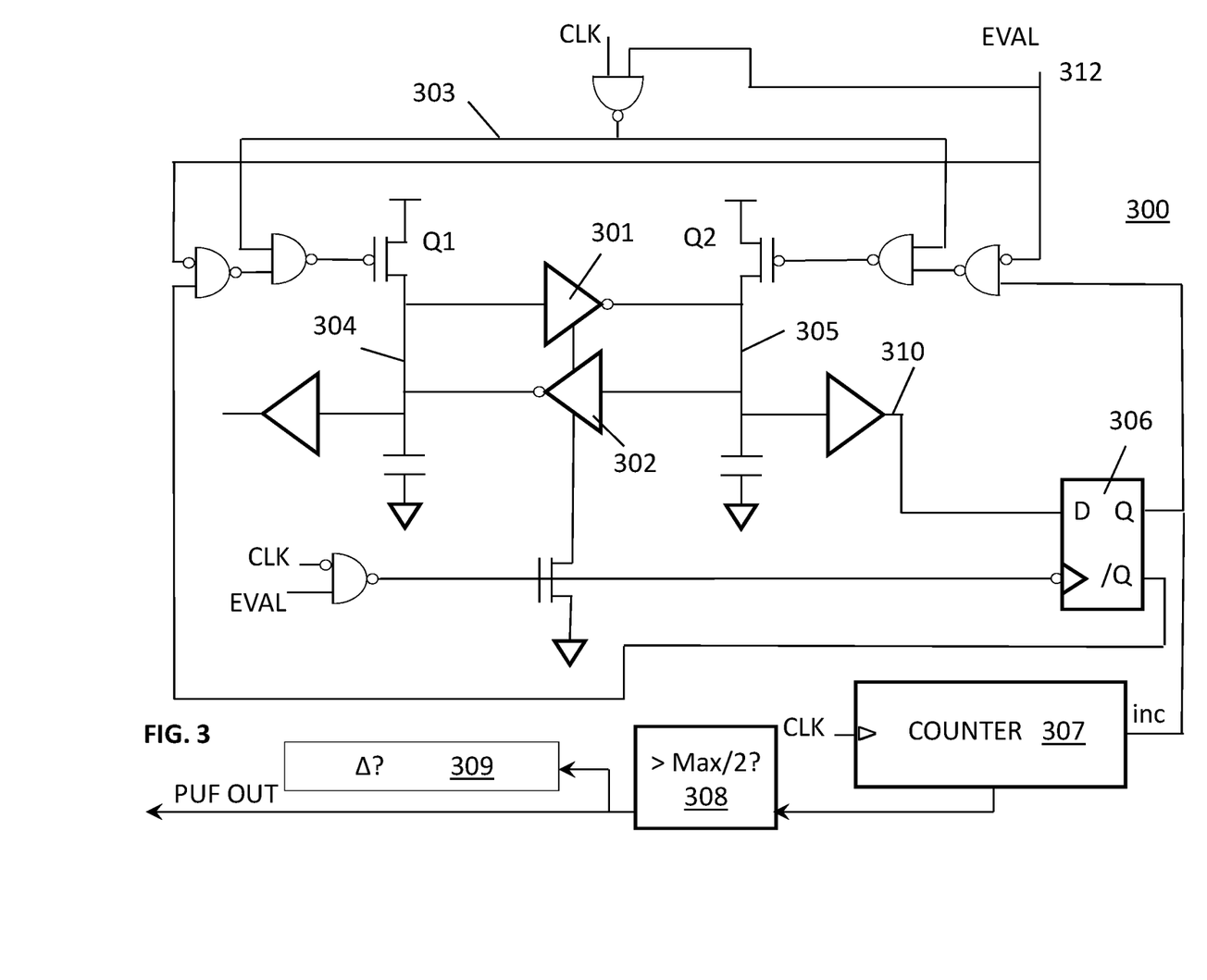
FIG. 3 shows another embodiment of a PUF circuit that includes circuitry to determine whether or not the PUF circuit is unstable.

FIG. 3 shows a PUF circuit 300 that has built in circuitry 307, 308 to test whether or not the PUF circuit 300 is unstable. Here, as observed in FIG. 3, a counter circuit 307 is coupled to receive the output of flip flop 306. Rather than take only one sample (i.e., transition the control value 103 to a value of 1 once per read of the PUF circuit 100 as described above with respect to FIG. 1), instead, multiple samples of the circuit 300 are taken and the output of the flip-flop 306 is fed to the counter circuit 307.

Here, multiple samples are taken by driving the control node 303 with a clock signal (CLK) when an evaluation input 312 is a logic high. Each time the clock transitions to a logic high, the circuit 300 will re-attempt to snap to a stable value. Upon each sample (i.e., each clock transition to a logic 1), the value latched by the flip-flop 306 is provided to the counter circuit 307. If the Q output of flip-flop 306 is a logic high, the counter circuit 307 will increment its count value in response After a number of such samples (e.g., 15), the value in the counter 307 is compared against the maximum possible counter value (which is determined from the bit width of the counter) by a comparison circuit 308. If the value in the counter 307 is greater than one half of the maximum possible counter value, the PUF circuit output is deemed to be a 1. Otherwise, the PUF circuit output is deemed to be a 0. Those of ordinary skill will recognize that the use of the counter 307 output and comparison circuit 308 in this manner corresponds to a temporal majority voting technique which reduces sparse errors in the PUF circuit signature.

Referring briefly back to FIG. 2, note that the respective flip flops 202_1 through 202_N of PUF circuits 201_1 through 201_N, each of which correspond to flip flop 306, actually feed a respective counter 307 and comparison logic circuit 308 which provides the PUF circuit output. Referring back to FIG. 3, a change detection circuit 309 records the signature of the PUF circuit 300 as determined by the comparison circuit 308.

A second round of (e.g., 15) samples is then again taken which may produce a different value in the counter 307. For unstable circuits, the output of the comparison circuit 308 may be different as between the two sets of samples (i.e., the PUF circuit 300 generated two different signatures across the two sets of samples). The change detection circuit 309 compares the stored (previous) signature with the current output from the comparison circuit 308. If the two are different, the PUF circuit 300 is deemed unstable. In a further embodiment, a number of sets of (e.g., 15) samples is taken and if the PUF circuit generates different signatures across any two successive samples the PUF circuit is deemed unstable (i.e., is identified as "dark").

Figure 4:
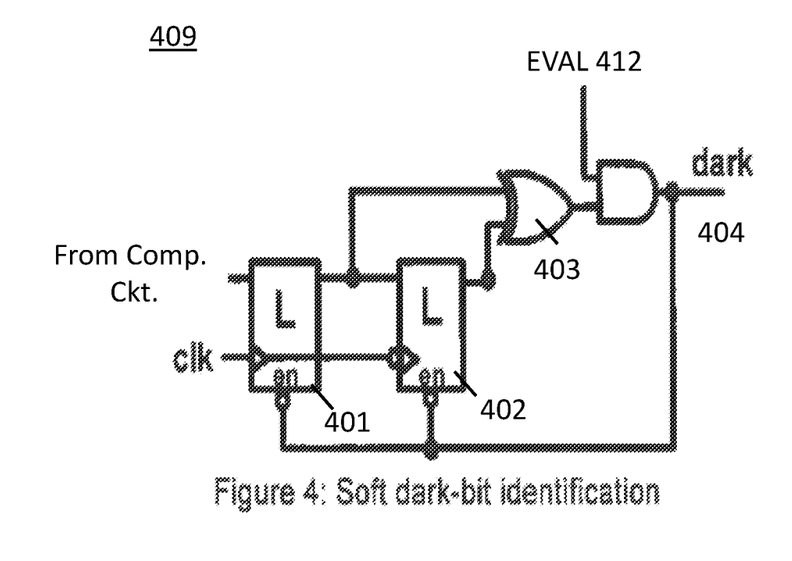
FIG. 4 shows a change detection circuit.

FIG. 4 shows one embodiment 409 of the change detection circuit 309 of FIG. 3. The output 404 indicates whether the PUF circuit is unstable or not. The output is enabled if the eval control signal 313, 412 is a logic high. The flip flop Q input 401 is coupled to the output of the comparison circuit 308 of FIG. 3. With each new set of samples, the PUF circuit generates a next PUF signature from the output of the comparison circuit 308 (which may be the same or different than the PUF signature generated from the preceding set of samples). The output of comparison circuit 308 is directed to input 401 and latched into a first flip-flop 401. Also with each new set of samples, the previous PUF circuit signature is latched from flip-flop 401 into flip-flop 402. Thus, flip-flip 401 holds the new PUF circuit signature and flip-flop 402 holds the immediately prior PUF circuit signature. If the two values are different, XOR gate 403 provides a high value which is propagated from output 404 to indicate that the PUF circuit is unstable.

If the PUF circuit is identified as dark, the identity of the PUF circuit is recorded in the dark bit mask so that, e.g., it cannot be used for chip ID/key purposes. However, in an embodiment, the PUF circuit and some/all of the other unstable PUF circuits that are identified on the dark bit mask are used instead as the core source(s) for a random number generator.

Figure 5:
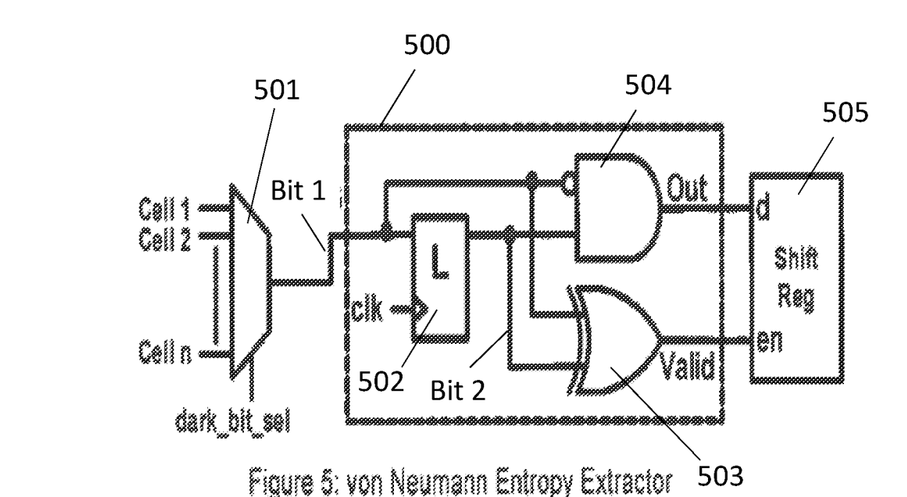
FIG. 5 shows a random number generator core circuit.

FIG. 5 shows a basic random number generator core circuit 500 that uses the unstable PUF cells that are identified by the dark bit mask as a source of random information. Here, the core circuit 500 of FIG. 5 shows a multiplexer 501 having input channels coupled to each PUF circuit ("cell") that has been instantiated on, e.g., a semiconductor circuit. In various embodiments, some of the PUF circuits that are coupled to multiplexer 501 are stable and are therefore used for chip identification (e.g., as per the circuit of FIG. 2) or some other use. That is, according to various embodiments, the respective outputs of a plurality of PUF circuits that are implemented on a semiconductor chip are coupled, e.g., not only to a chip identification circuit (as per FIG. 2) but are also coupled to a random number generator circuit 500 (as per FIG. 5). The PUF circuits deemed stable have their outputs directed to the chip identification circuit whereas the PUF circuits deemed unstable have their outputs used by the random number generator circuit 500.

In the core circuit 500 of FIG. 5, information from the dark bit mask is used to control the channel select input of multiplexer 501, which, in turn, causes only unstable PUF circuits to have their output values selected by multiplexer 501. In an embodiment, the dark bit mask is scrolled through, e.g., sequentially, randomly or pseudo-randomly to select the respective output values of a series of unstable PUF circuits. Here, clock values are concurrently fed to the unstable PUF circuits commensurate with the scrolling through of PUF circuit identities on the dark bit mask.

For example, assuming an embodiment where the dark bit mask is scrolled through in series (e.g., from "top" to "bottom"), initially, the unstable PUF circuits are fed a clock pulse to cause them to snap to whatever state they each snap to. The dark bit mask is then scrolled through from top to bottom such that each unstable PUF circuit is sampled once and selected by the multiplexer 501. After the dark bit mask has been fully scrolled through (reached the bottom), the process repeats. That is, the unstable PUF circuits are fed a another clock pulse so they can each snap to whatever state they snap to and the dark bit mask is again scrolled through (or, e.g., from bottom to top or top to bottom again). Note that with each clock pulse the output state of the set of unstable PUF circuits should continuously and randomly change.

With respect to the core random number generator 500 of FIG. 5, as the unstable PUF circuit outputs are selected by scrolling through the dark bit mask and presenting their respective identities to the channel select input of multiplexer 501, a bit stream (labeled Bit 1 in FIG. 5) will be generated at the output of the multiplexer 501. Here, each next bit of the bit stream corresponds to the output bit of a next sampled unstable PUF circuit. Each next bit of the Bit 1 bit stream is latched into a latch 502 and compared against its immediate predecessor (labeled Bit 2 in FIG. 5) by XOR gate 503. If the two bits are different, the output of logic gate 504 is deemed valid and its output permitted to enter a shift register 505 that receives the output bits from the core circuit 500. The logic gate 504 has two potential different output states that characterize whether the two-bit bit steam (Bit 1, Bit 2) is (1,0) or (0,1). Thus, the shift register 505 is only loaded with new information when there is a difference in the Bit 1, Bit 2 bit stream thereby capturing more randomness from the set of unstable PUF circuits.

Figure 6:
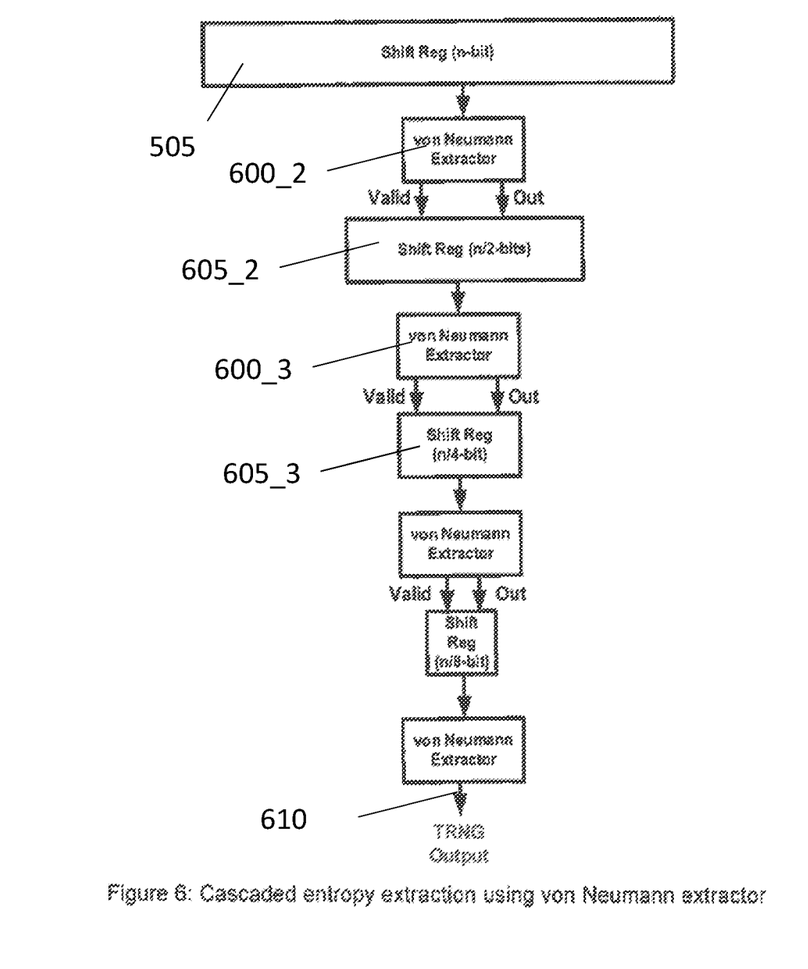
FIG. 6 shows a random number generator circuit.

As observed in FIG. 6, a series of increasingly smaller input bit width random number generator cores 600_2, 600_3, . . . can be chained together to further introduce randomness into the generated bit pattern and/or increase the output bit rate of the random number generator. Here, referring briefly back to FIG. 5, note that the unstable PUF circuits that are selected for input to multiplexer 501 can be seen as an input word having some width. That is, if there are X unstable PUF circuits, the input word to multiplexer 501 has a width of X and the Bit 1 bit stream is generated by selecting each of the X bits of the X bit wide input word.

Here, referring to FIGS. 5 and 6, shift register 505 can be viewed as providing a next word of width Y for a next core random number generator circuit 600_2 like the core circuit 500 of FIG. 5. In an embodiment, the output of the shift register 505 of the first core circuit 500 has a width that is half that of the number of unstable PUF circuits used by the first core random number generator circuit 500 shown in FIG. 5. That is, in an embodiment, the output bit width of shift register 505 is X/2.

Referring to FIGS. 5 and 6, a next random number generator core circuit 600_2, similar to the core circuit 500 of FIG. 5, is provided with the Y=X/2 wide word from shift register 505. The output shift register 605_2 of the second random number generator core 600_2, however, only provides a Y/2=X/4 wide output word. A next random number generator core circuit 600_3, also similar to the core circuit 500 of FIG. 5, receives the X/4 wide output word from shift register 605_2 and provides its random bits into an output shift register 605_3 that is Y/4=X/8 bits wide. The chain of random number generators successively reduce the bit width until the bit width of the desired random number is reached at the overall random number generator output 610.

Note that the both the orientation to select randomness by the core circuits 500, 600_2, 600_3, etc. introduces additional entropy or randomness into the final value that is provided at the random number generator output 610. The introduction of such randomness should help compensate for any PUF circuits deemed unstable that in fact do possess some stability or bias toward a particular output state. For instance, an unstable PUF circuit that repeatedly snaps to a 1 for 47% of its samples and to 0 for 53% of its samples demonstrates some bias/stability toward a value of 1. The increased entropy/randomness introduced by the random number generator circuits 500, 600 of FIGS. 5 and 6 should add additional entropy/randomness so as to offset any such bias/stability in the original PUF circuits.

The cascading of multiple random generators with reducing bit width also should increase the bit rate of the random number generator. Here, the presence of multiple shift registers corresponds to the overall circuit holding onto a large prior history of highly random information. The funneling down to smaller word sizes essentially extracts closer to pure random information at a sufficiently high bit rate from the prior history.

In alternate embodiments the order in which the bits from the unstable PUF circuits are cascaded can be altered/varied (e.g., with time). The cascading can also happen temporally meaning, multiple bits from the same unstable PUF cell can be fed to the core random number generator 500 to enhance the entropy of the randomized output. The implementation of the cascade structure and which bits are consumed by the core random number generator as presented herein is only exemplary (other embodiments may take different approaches).

The output of the random number generator may be coupled to, e.g., an encryption and/decryption circuit, or other security circuit (e.g., for implementing a password or other random identifier). Although embodiments described above have focused upon circuitry implemented on a single semiconductor chip, alternate embodiments may include other systems such as circuits disposed on a planar board (e.g., "PC" board).

Figure 7:
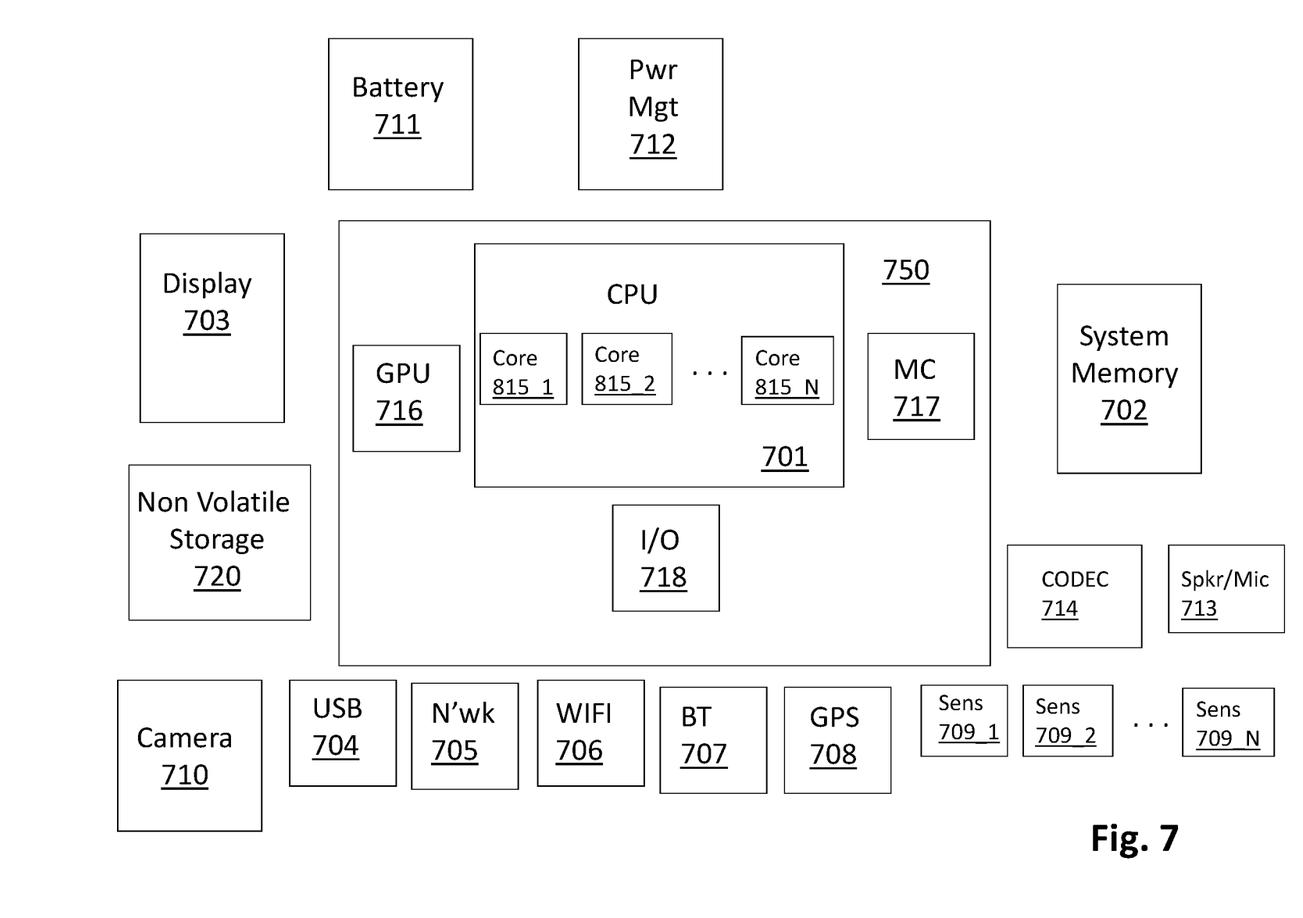
FIG. 7 shows a computing system.

FIG. 7 shows a depiction of an exemplary computing system 700 such as a personal computing system (e.g., desktop or laptop) or a mobile or handheld computing system such as a tablet device or smartphone, or, a larger computing system such as a server computing system. As observed in FIG. 7, the basic computing system may include a central processing unit 701 (which may include, e.g., a plurality of general purpose processing cores and a main memory controller disposed on an applications processor or multi-core processor), system memory 702, a display 703 (e.g., touchscreen, flat-panel), a local wired point-to-point link (e.g., USB) interface 704, various network I/O functions 705 (such as an Ethernet interface and/or cellular modem subsystem), a wireless local area network (e.g., WiFi) interface 706, a wireless point-to-point link (e.g., Bluetooth) interface 707 and a Global Positioning System interface 708, various sensors 709_1 through 709_N (e.g., one or more of a gyroscope, an accelerometer, a magnetometer, a temperature sensor, a pressure sensor, a humidity sensor, etc.), a camera 710, a battery 711, a power management control unit 712, a speaker and microphone 713 and an audio coder/decoder 714.

An applications processor or multi-core processor 750 may include one or more general purpose processing cores 715 within its CPU 701, one or more graphical processing units 716, a memory management function 717 (e.g., a memory controller) and an I/O control function 718. The general purpose processing cores 715 typically execute the operating system and application software of the computing system. The graphics processing units 716 typically execute graphics intensive functions to, e.g., generate graphics information that is presented on the display 703. The memory control function 717 interfaces with the system memory 702. The system memory 702 may be a multi-level system memory having different caching structures in a faster level of system memory.

In various embodiments physical unclonable circuits may be integrated into the computing system and coupled to a signature circuit and/or a random number generator as described at length above.

Each of the touchscreen display 703, the communication interfaces 704-707, the GPS interface 708, the sensors 709, the camera 710, and the speaker/microphone codec 713, 714 all can be viewed as various forms of I/O (input and/or output) relative to the overall computing system including, where appropriate, an integrated peripheral device as well (e.g., the camera 710). Depending on implementation, various ones of these I/O components may be integrated on the applications processor/multi-core processor 750 or may be located off the die or outside the package of the applications processor/multi-core processor 750. The mass storage of the computing system may be implemented with non volatile storage 720 which may be coupled to the I/O controller 718 (which may also be referred to as a peripheral control hub).

Embodiments of the invention may include various processes as set forth above. The processes may be embodied in machine-executable instructions. The instructions can be used to cause a general-purpose or special-purpose processor to perform certain processes. Alternatively, these processes may be performed by specific hardware components that contain hardwired logic for performing the processes, or by any combination of software or instruction programmed computer components or custom hardware components, such as application specific integrated circuits (ASIC), programmable logic devices (PLD), programmable logic arrays (PLAs), or field programmable gate array (FPGA).

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. An apparatus, comprising:

a plurality of physically unclonable circuits;

first circuitry to detect which ones of the physically unclonable circuits are unstable and which ones of the physically unclonable circuit are stable, the first circuitry comprising a respective signature change detection circuit for each of the physically unclonable circuits;

second circuitry to steer unstable ones of the physically unclonable circuits to a random number generator circuit and steer stable ones of the physically unclonable circuit to a security circuit; and, wherein, the random number generator circuit comprises a circuit that invalidates same data values from two consecutively sampled unstable physically unclonable circuits, and wherein, the random number generator circuit further comprises a multiplexer having separate input channels coupled to different ones of the physically unclonable circuits, the multiplexer comprising a channel select input, the channel select input to be driven by information from a dark bit mask that identifies which ones of the physically unclonable are unstable.

2. The apparatus of claim 1 wherein the random number generator circuit comprises a series of random number generator cores.

3. The apparatus of claim 2 wherein the series of random number generator cores are to progressively operate on smaller bit widths of random information.

4. The apparatus of claim 2 wherein the random number generator comprises registers between the random number generator cores, the registers to hold random information between the random number generator cores.

5. A computing system, comprising:
a plurality of processing cores;
a system memory;
a memory controller coupled between the system memory and the plurality of processing cores;
a plurality of physically unclonable circuits;
first circuitry to detect which ones of the physically unclonable circuits are unstable and which ones of the physically unclonable circuit are stable, the first circuitry comprising a respective signature change detection circuit for each of the physically unclonable circuits;
second circuitry to steer unstable ones of the physically unclonable circuits to a random number generator circuit and steer stable ones of the physically unclonable circuit to a security circuit; and,
wherein, the random number generator circuit comprises a circuit that invalidates same data values from two consecutively sampled unstable physically unclonable circuits, and wherein, the random number generator circuit further comprises a multiplexer having separate input channels coupled to different ones of the physically unclonable circuits, the multiplexer comprising a channel select input, the channel select input to be driven by information from a dark bit mask that identifies which ones of the physically unclonable are unstable.

6. The computing system of claim 5 wherein the random number generator circuit comprises a series of random number generator cores.

7. The computing system of claim 6 wherein the series of random number generator cores are to progressively operate on smaller bit widths.

8. The computing system of claim 6 wherein the random number generator comprises registers between the random number generator cores, the registers to hold random information between the random number generator cores.

9. An apparatus, comprising:
a plurality of physically unclonable circuits;
first circuitry to detect which ones of the physically unclonable circuits are unstable and which ones of the physically unclonable circuit are stable, the first circuitry comprising a respective signature change detection circuit for each of the physically unclonable circuits;
second circuitry to steer unstable ones of the physically unclonable circuits to a random number generator circuit and steer stable ones of the physically unclonable circuit to a security circuit;
circuitry to couple the stable ones of the physically unclonable circuits to a chip signature circuit; and,
wherein, the random number generator circuit comprises a circuit that invalidates same data values from two consecutively sampled unstable physically unclonable circuits, and wherein, the random number generator circuit further comprises a multiplexer having separate input channels coupled to different ones of the physically unclonable circuits, the multiplexer comprising a channel select input, the channel select input to be driven by information from a dark bit mask that identifies which ones of the physically unclonable are unstable.

10. The apparatus of claim 9 wherein the random number generator circuit comprises a series of random number generator cores.

11. The apparatus of claim 10 wherein the series of random number generator cores are to progressively operate on smaller bit widths.

* * * * *